US006574750B1

(12) United States Patent
Felber et al.

(10) Patent No.: US 6,574,750 B1
(45) Date of Patent: Jun. 3, 2003

(54) PRESERVING CONSISTENCY OF PASSIVELY-REPLICATED NON-DETERMINISTIC OBJECTS

(75) Inventors: Pascal Felber, Portland, OR (US); Gary Hallmark, Portland, OR (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 09/478,946

(22) Filed: Jan. 6, 2000

(51) Int. Cl.[7] .................................................. G06F 11/00
(52) U.S. Cl. ........................... 714/20; 714/18; 707/202
(58) Field of Search ............................ 714/18, 20, 16; 707/202; 705/6, 5

(56) References Cited

U.S. PATENT DOCUMENTS

| 5,864,854 | A | | 1/1999 | Boyle | |
|---|---|---|---|---|---|
| 5,963,915 | A | * | 10/1999 | Kirsch | 705/26 |
| 6,223,215 | B1 | * | 4/2001 | Hunt et al. | 709/217 |
| 6,301,601 | B1 | * | 10/2001 | Helland et al. | 709/101 |
| 6,356,916 | B1 | * | 3/2002 | Yamatari et al. | 707/201 |
| 6,446,048 | B1 | * | 9/2002 | Wells et al. | 705/35 |
| 6,457,065 | B1 | * | 9/2002 | Rich et al. | 709/328 |
| 6,477,546 | B1 | * | 11/2002 | Velamuri et al. | 707/202 |
| 6,490,610 | B1 | * | 12/2002 | Rizvi et al. | 709/101 |

OTHER PUBLICATIONS

Gray, Jim & Reuter, Andreas. Transaction Processing: Concepts and Techniques, 1993, Morgan Kaufmann Publishers, Inc.*

Lars Frank, et al., "Semantic ACID Properties in Multidatabases Using Remote Procedure Calls and Update Propagations," Software Practice & Experience, GB, John Wiley & Sons Ltd, vol. 28, No. 1, 1998, pp. 77–98, XP000727317.

C. J. Hou, et al., "Effective and concurrent checkpointing and recovery in distributed systems," IEE Proceedings: Computers and Digital Techniques, GB, IEE, vol. 144, No. 5, Sep. 1, 1997, pp. 304–316, XP000750772.

Yasemin Turkan, et al., "An Efficient Memory Management Algorithm for Client–Server Database Management Systems," Computer Journal, GB, Oxford University Press, Surrey, vol. 39, No. 5, 1996, pp. 374–385, XP000640645.

* cited by examiner

*Primary Examiner*—Robert Beausoliel
*Assistant Examiner*—Christopher S. McCarthy
(74) *Attorney, Agent, or Firm*—Hickman Palermo Truong & Becker LLP; Brian D. Hickman

(57) ABSTRACT

Techniques are provided for executing an operation in which a client invokes a replicated object. According to one technique, a primary replica of a replicated object receives a first request from a client, wherein the first request includes a request identifier. Rather than immediately attempting to process the request, the primary replica determines whether a record exists that corresponds to the request identifier. If a record exists that corresponds to the request identifier, then the primary replica responds to the first request with a reply associated with the record. If no record exists that corresponds to the request identifier, then the primary replica performs the steps of: starting a transaction; as part of the transaction, processing the request; as part of the transaction, storing a record associated with the request identifier and a reply to the request; committing the transaction; and delivering the reply to the client. The client may itself be a replicated object. If the client is nondeterministic, then the transaction initiated by the primary replica may be a nested transaction relative to a transaction executed by the client, or be executed as part of the same transaction as the client. If the transaction executed by the primary replica is executed as part of the same transaction as the client, then a savepoint may be established before the primary replica processes the request, so that a failure will not necessarily require all processing performed by the client to be rolled back.

27 Claims, 9 Drawing Sheets

PRESERVING CONSISTENCY OF PASSIVELY-REPLICATED NON-DETERMINISTIC OBJECTS

FIELD OF THE INVENTION

The present invention relates to replication and, more specifically, to techniques for preserving consistency of passively-replicated non-deterministic objects.

BACKGROUND OF THE INVENTION

It has become critical that the electronic systems on which society relies remain available and consistent. With respect to availability, a single instance of unavailability may tarnish or even cripple a company that relies on electronic commerce. With respect to consistency, there is a certain class of operations that should be performed if and only if other operations are also performed. For example, in a transfer of funds between bank accounts, the withdrawal of money from one account should occur if and only if the deposit of money into the other account also occurs.

The definition of consistency must be refined in the context of highly-available mission-critical applications. Online shopping, for instance, involves critical interactions between clients and the business application on the electronic commerce site. Unfortunately, when an error occurs during request processing (such as the failure of the client, the network, or the server), the client has generally no way to know whether his request has been processed or not.

Application servers generally provide at-most-once semantics, guaranteeing that, if the request has been processed, it has been processed only once. This quality of service is not sufficient since it puts the responsibility on the client to decide whether or not the request must be reissued.

The quality of service required by mission-critical distributed applications is exactlyonce. Ideally, the client wants the guarantee that its request will eventually be processed, and that processing will happen only once. This problem is known as end-to-end reliability. The "all-or-nothing" property necessary for application consistency should ideally become "all".

End-to-end reliability can be defined as the guarantee that a request sent by a client to a server will be eventually processed and that the client will get a reply, despite the failure of any server component in the system. The request will be processed exactly once by the server. In addition, if the client fails it can still obtain the reply after recovering.

A typical scenario is that of an end-user buying airplane tickets through an electronic-commerce site. If the site fails before the user checks out, then he will have to start his selection over, but he will not be billed for what he had selected before the failure. However, if a failure occurs after the user has confirmed his purchase but before the reception of the receipt, then he cannot usually know whether the request has been processed or not, the site has to provide journalization mechanisms that can be assessed by end users.

In this scenario, end-to-end reliability means that the user has the guarantee that his request will be eventually processed once it has been submitted, if the client application (e.g., web browser) does not fail. If the client fails, then the request can be re-issued upon recovery with the guarantee that it will not be processed twice.

This scenario can be extended to involve nested invocations. For example, end-users can plan their vacations through a site that mediates the purchase of airline tickets, car rentals, and hotel reservations. This example illustrates the use of nested invocations between applications servers: the vacations site acts as a client of other sites for booking plane tickets, cars, and hotel rooms.

This scenario shows problems that may happen with partial request execution. Consider the case of an end-user who wants to travel to London. If the vacations planning server books a car and a hotel room in London but fails before obtaining the plane ticket, the first two reservations are meaningless. Note that, in this case, end-to-end reliability does not mean that all three reservations will succeed. It rather means that the client's request will be processed completely. The vacations planner site may for instance cancel the car and hotel reservations if all planes to London are full.

Replication is a technique that is widely used to increase the availability of systems. In general, replication involves maintaining copies ("replicas") of a resource so that if one replica fails, another replica may be used. For example, many clients may require access to a particular database table. To increase availability, many copies of the table may be managed by many different database servers. If one of the copies of the table becomes corrupt, or if one of the database servers fails, all clients that were accessing the copy of the table that is no longer available may continue to access the table using a different copy thereof.

A replicated object is represented by a set of copies. This set may be static or dynamic. Static replication requires that the number and the identity of the copies do not change during the lifetime of the replicated object, while dynamic replication allows copies to be added or removed at runtime.

In distributed systems, the two best-known replication policies are active replication and passive replication (also called primary-backup replication). With active replication, all copies of the replicated object play the same role. Thus, when a client sends a request to an actively-replicated object, all replicas of the object receive each request, process the request, update their state in response to the request, and send a response back to the client. Because the requests are always being sent to every replica, the failure of one of the replicas is transparent to the client.

With passive replication, one replica is designated as the primary replica, while all other replicas are backups. Clients perform requests by sending messages only to the primary replica, which executes the request, updates the other replicas, and sends the response to the client. If the primary replica fails, then one of the backup replicas takes over the responsibility of being the primary replica.

The main problem with replication is that conventional replication techniques require replicated objects to be deterministic. An object is said to be deterministic if the outcome of a request issued to the object (an "invocation" of the object) depends only of the state of the object prior to the invocation and the parameters of the invocation. Thus, two deterministic objects having identical states will keep identical states if they both receive the same set of invocations in the same order.

The integrity of a system may be compromised if replicated objects are not deterministic. For example, in an active replication system, if two replicas arrive at different states based on the same input, then switching between the replicas may result in unpredictable behavior. In passive replication systems, the problem created by nondeterministic objects is less apparent, but just as troublesome, in particular when the nondeterministic objects interact with other entities.

FIG. 1 illustrates a scenario in which a client C invokes a single replicated object X, which in turn invokes another replicated object Y and then a non-replicated object Z. The set of nested invocations form an "invocation tree". In this scenario, Y is aware of replication since it is replicated itself, while Z may not be aware of replication at all. Consequently, it may be assumed that only Y implements mechanisms for dealing with replicated invocations.

The main problem when dealing with replicated objects is to maintain the consistency of the replicated state, i.e., to ensure that all replicas agree on a common state. Consistency must be preserved at all levels of the invocation tree. For instance, in FIG. 1, it is not acceptable that Y receives and processes a request while Z does not because of the failure of X. The replication mechanisms must ensure that either all objects in the invocation tree process their request, or that none of them does. This all-or-nothing property is similar to the atomicity property of a transactional system.

One approach for guaranteeing atomicity of invocations in scenarios such as that shown FIG. 1 is referred to as the roll-forward approach. The roll-forward approach uses redundancy to ensure that another replica will transparently take over upon failure of the primary without any loss of information. Consistency is maintained by guaranteeing that the invocation will succeed despite failure (by "rolling forward"). Passive replication techniques that use a roll-forward approach ensure that only the primary replica processes the requests. Updates are sent to the backup replicas. If the primary replica fails during the processing of a request, a backup replica is chosen to be the new primary replica. The request during which the failure occurred is then sent to the new primary replica, which continues processing at that point.

It is commonly believed that a passive replication technique with a roll-forward approach is sufficient to support non-deterministic servers. However, these techniques are sufficient only for failure-free case, because a non-deterministic object may interact with other objects, the identity of which depends on non-deterministic factors. For instance, in FIG. 1, X may invoke Y if some condition is met (e.g., some timer has not yet expired) and Z otherwise. In this situation, X may crash after having invoked Y, but before having updated the backups. The backup that takes over and processes the invocation may invoke Z instead of Y and leave the system in an inconsistent state.

Unfortunately, in many real-world situations and systems, determinism cannot be guaranteed. Thus, there is a need for a system and technique for providing the benefits of object replication while maintaining the accuracy of results in an environment that cannot guarantee that the replicated objects are deterministic.

SUMMARY OF THE INVENTION

Techniques are provided for executing an operation in which a client invokes a replicated object. According to one technique, a primary replica of the replicated object receives a first request from the client, wherein the first request includes a request identifier. Rather than immediately attempting to process the request, the primary replica determines whether a record exists that corresponds to the request identifier. If a record exists that corresponds to the request identifier, then the primary replica responds to the first request with a reply associated with the record. If no record exists that corresponds to the request identifier, then the primary replica performs the steps of: starting a transaction; as part of the transaction, processing the request; as part of the transaction, storing a record associated with the request identifier and a reply to the request; committing the transaction; and delivering the reply to the client.

The client may itself be a replicated object. If the client is nondeterministic, then the transaction initiated by the primary replica may be a nested transaction relative to a transaction executed by the client, or be executed as part of the same transaction as the client. If the transaction executed by the primary replica is executed as part of the same transaction as the client, then a savepoint may be established before the primary replica processes the request, so that a failure will not necessarily require all processing performed by the client to be rolled back.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
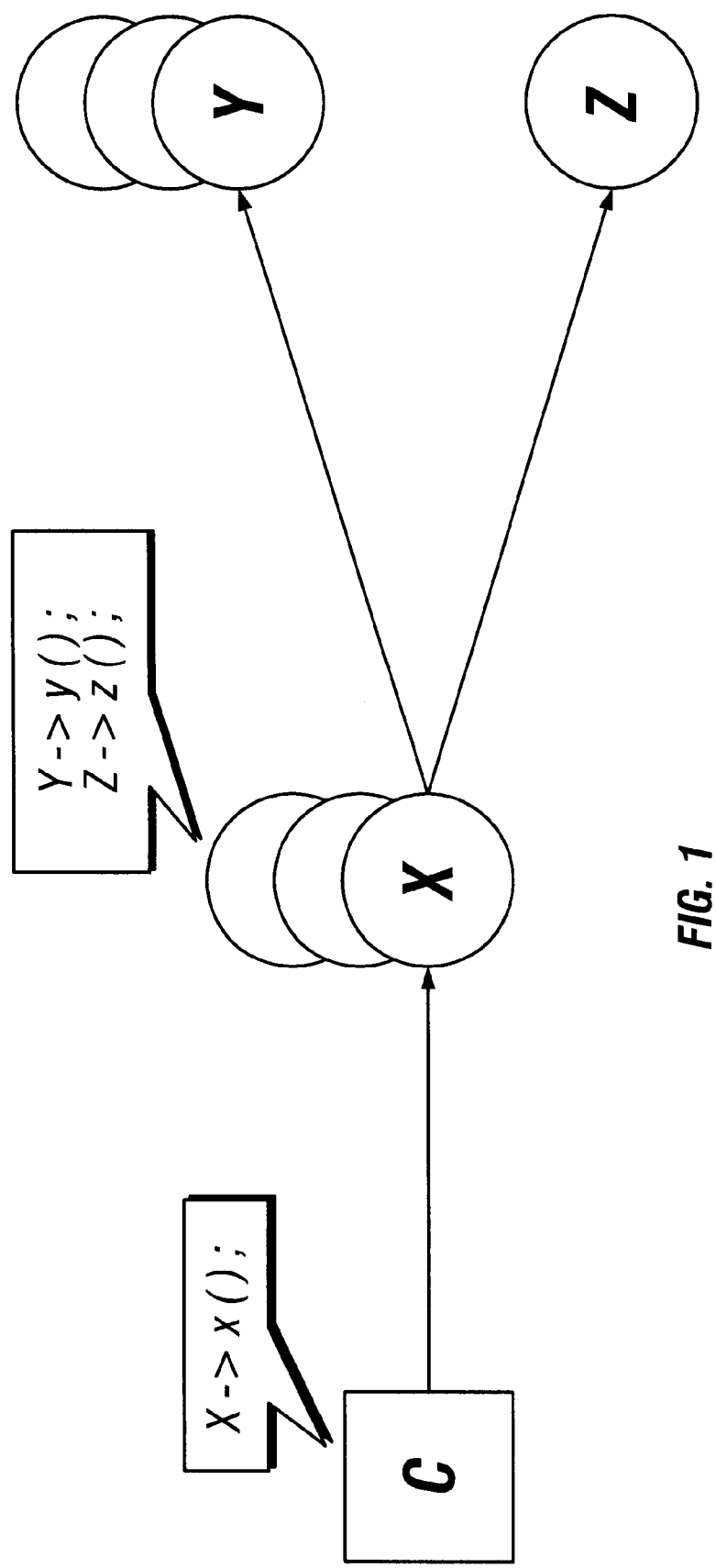
FIG. 1 is a block diagram of a system in which a client invokes a replicated object, which in turn invokes two other objects.

A method and apparatus for executing an operation in which a client invokes a replicated object is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Techniques are provided for performing passive replication using a "roll-backwards" approach that does not require determinism from replicated objects. The techniques can be applied, for example, in the context of distributed middleware to provide transparent replication and fail-over. The technique is based on transactions, and has different properties than the traditional approaches that are based on group communication and roll-forward techniques.

Transactions

A transaction is a sequence of operations on objects or data items that satisfies the following for properties (ACID properties):

Atomicity: all the operations of the transaction are performed, or none of them is performed.

Consistency: a transaction must be correct, by transforming the data from one consistent state to another.

Isolation: when several transactions are executed concurrently, each of them must appear as if it is executed alone.

Durability: despite crashes, the effect of the performed operations is permanent.

If a failure occurs in the system or the transaction can not be committed for some reason, it will roll back, i.e., all modifications performed up to this point will be undone and the system will revert to its previous state. Some systems support nested transactions, where transactions can be started in the scope of another transaction. If the nested transaction fails, the enclosing transaction does not automatically roll back and the application can try to correct the problem and retry the transaction. If the enclosing transaction rolls back, then all nested transactions also roll back.

Transaction-Based Passive Replication

Techniques are provided for performing transaction-based passive replication in a manner that achieves accurate results even when a failure occurs in a non-deterministic replicated object. For the purpose of illustration, the techniques shall be described with reference to a system that includes an invocation tree that involves three entities. The first entity in the invocation tree shall be referred to as the client, or "C", The second entity in the invocation tree (the entity called by the client) shall be referred to as object X, or "X", The third entity in the invocation tree (the entity called by X) shall be referred to as object Y, or "Y", It should be noted that the designations given to these entities are merely for the purpose of explanation, and do not in any way limit the nature of the entities involved. Further, the techniques are in no way limited to invocation trees that involve three entities. However, a three-entity invocation tree is sufficient to illustrate how all entities in an invocation tree may respond relative to the entity that invokes them and the entities that they invoke.

Figure 2A:
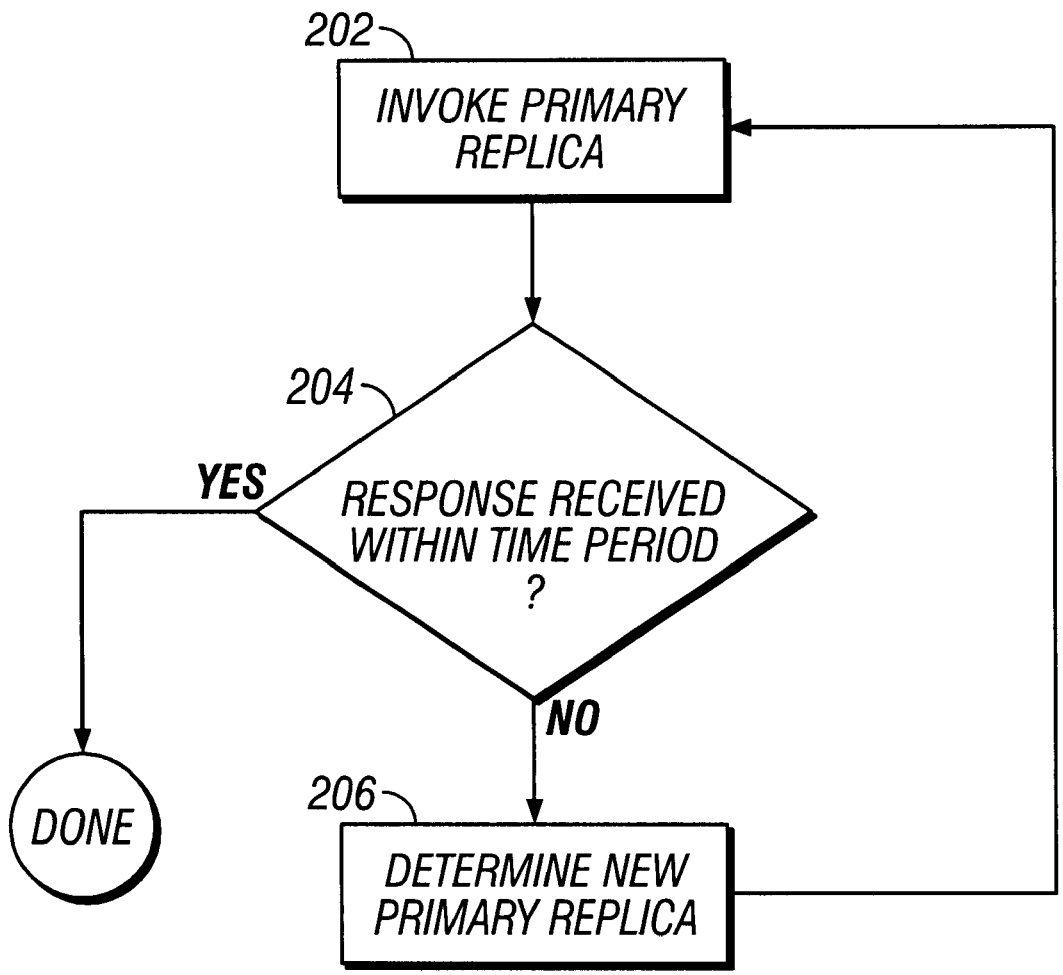
FIG. 2A is a flowchart of steps performed by a client according to an embodiment of the invention.

FIG. 2A is a flowchart that illustrates the steps performed by a client C in a transaction-based passive replication system according to one embodiment of the invention. Referring to FIG. 2A, at step 202, the client C invokes the primary replica of object X. The primary replica of object X shall be referred to herein as X1. After invoking X1, client C waits for a response from X1. If X1 does not respond within a predetermined amount of time (step 204), client C assumes that X1 has failed, and selects a new primary replica (step 206). Client C then invokes the new primary replica (202). This sequence is repeated until one of the replicas of object X successfully responds to the invocation within the specified amount of time.

Figure 2B:
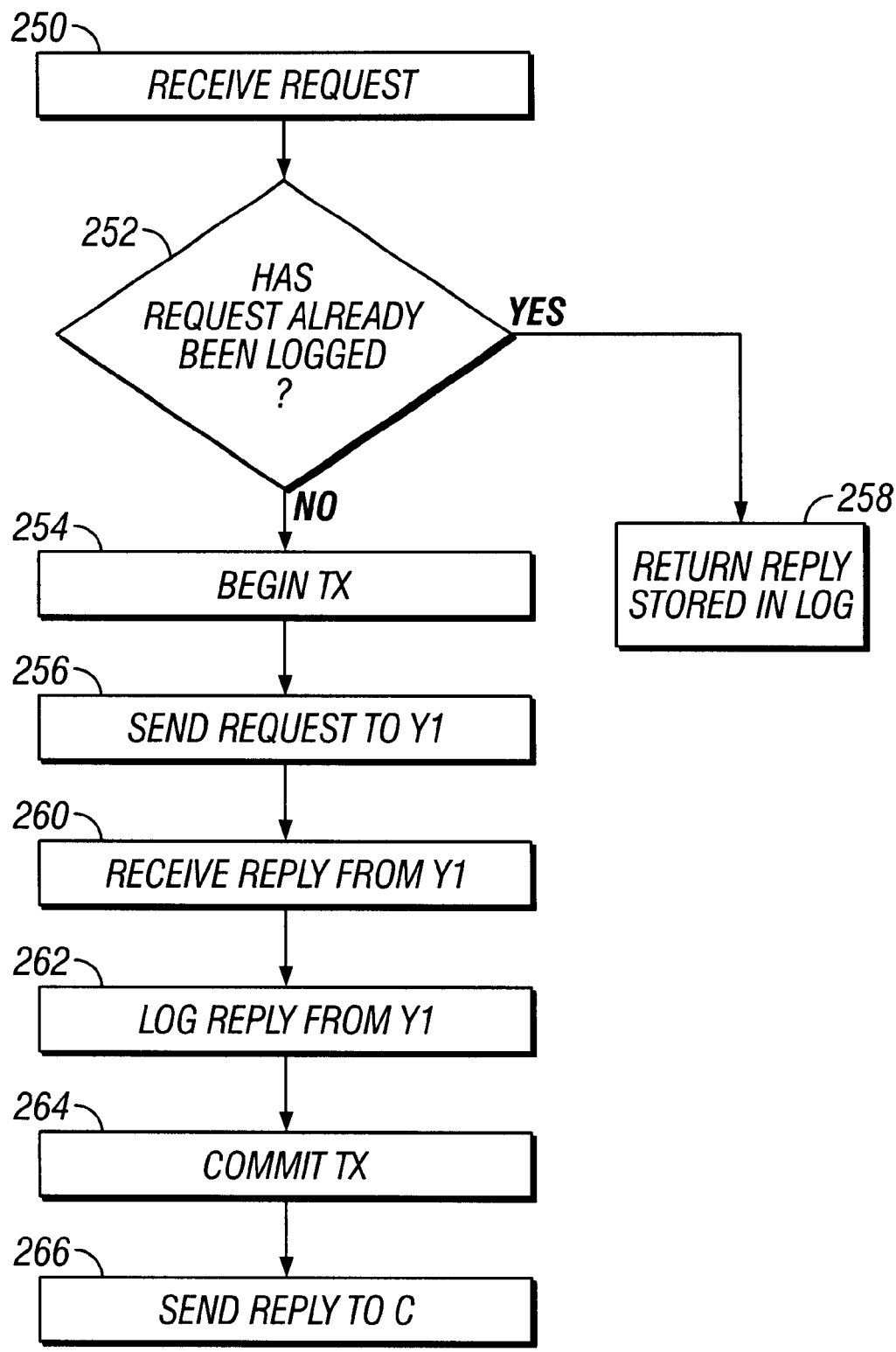
FIG. 2B is a flowchart of steps performed by the primary replica of a replicated object according to an embodiment of the invention.

FIG. 2B is a flowchart that illustrates the steps performed by the primary replica of object X in a transaction-based passive replication system according to one embodiment of the invention. Referring to FIG. 2B, at step 250, the primary replica of object X (i.e. X1) receives the request from client C. At step 252, X1 determines whether the received request is identical to a request that was already processed by object X. According to one embodiment, this determination is made by (1) reading a request identifier from the request, and (2) comparing the request identifier against request identifiers contained in records stored in a log, where the log contains records of all replies that have been committed by all replicas of object X. If the request identifier in the request matches the request identifier in a log record, then X1 responds to the request by returning the reply indicated by the log record (step 258).

If the request identifier in the request does not match the request identifier in any log record, then control passes to step 254. At step 254, X1 begins a transaction TX. After beginning the transaction, X1 performs, as part of the transaction, all of the operations required to service the request. For the purpose of illustration, it shall be assumed that one of those operations involves invoking another replicated object Y. Thus, at step 256, X1 sends a request to the primary replica of object Y (Y1). At step 260, X1 receives a reply from Y1. At step 262, X1 logs the reply from Y1. At step 264, after all of the operations required by the request have been performed by X1, X1 commits the transaction. After committing the transaction, X1 sends the reply to the request to C.

It should be noted that, relative to Y1, X1 is a client. Consequently, when X1 sends a request to Y1, X1 performs the steps shown in FIG. 2A. Specifically, X1 waits for a response. If the response does not come within a predetermined period of time from the transmission of the request to Y1, then X1 selects a different replica of Y to be the primary replica, and sends the request to the new primary replica of Y. This process is repeated until X1 successfully receives a reply from one of the replicas of Y.

As shall be illustrated by the scenarios described hereafter, in a system where clients and primary replicas are configured to operate as shown in FIGS. 2A and 2B, respectively, the clients receive correct responses even when failures occur in non-deterministic replicated objects.

No-Failure Scenario

Figure 3:
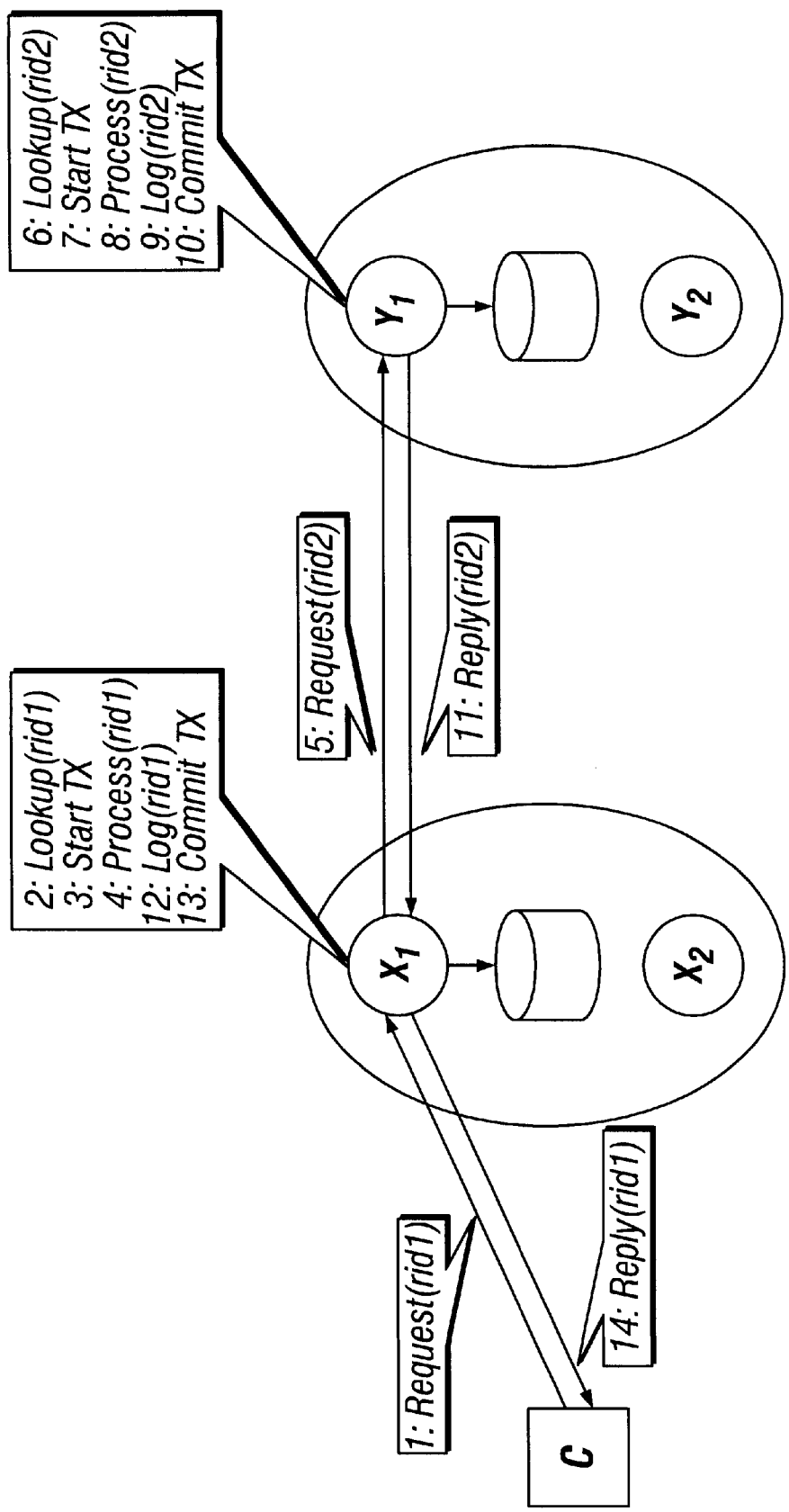
FIG. 3 is a block diagram illustrating a no-failure scenario according to an embodiment of the invention.

FIG. 3 is a block diagram that illustrates the sequence of events when no error occurs in a three-entity invocation tree, where the clients and primary replicas are configured to operate as described in FIGS. 2A and 2B, respectively. Referring to FIG. 3, the client C invokes the primary replica of X (X1). The invocation includes a request identifier (rid1). Upon receiving the invocation, X1 performs a lookup operation to determine whether a log contains a record associated with rid1. In the present example, C has not previously issued the request, so the log will not contain any record associated with rid1.

Upon determining that the log does not have a record for rid1, X1 begins a transaction TX and then processes the request as part of the transaction. As part of processing the request, X1 invokes the primary replica of Y (Y1). Y1 The invocation of Y1 includes a request identifier (rid2). Upon receiving the invocation, Y1 performs a lookup operation to determine whether a log contains a record associated with rid2. In the present example, X1 has not previously issued the request, so the log will not contain any record associated with rid2.

Upon determining that the log does not have a record for rid2, Y1 begins a transaction and then processes the request as part of the transaction. According to one embodiment, the transaction started by Y1 is nested within the transaction started by X1. Consequently, the transaction started by Y1 can be rolled back without rolling back the entire transaction initiated by X1. Further, the transaction started by Y1 will be automatically rolled back if the transaction initiated by X1 is rolled back.

For the purpose of illustration, it shall be assumed that Y1 does not invoke any other entity during the processing of the request. After processing the request, Y1 logs a record for rid2 that includes the reply to the request associated with rid2. Y1 then commits the nested transaction, and sends the reply to X1.

After receiving the reply from Y1, X1 logs a record for rid 1 that includes the reply to the request associated with rid1. X1 then commits the transaction, and sends its reply to C. The nested transaction initiated by Y1 is committed in response to the commission of the transaction initiated by X1.

Failure of Y1 Before Y1 Commits

Figure 4:
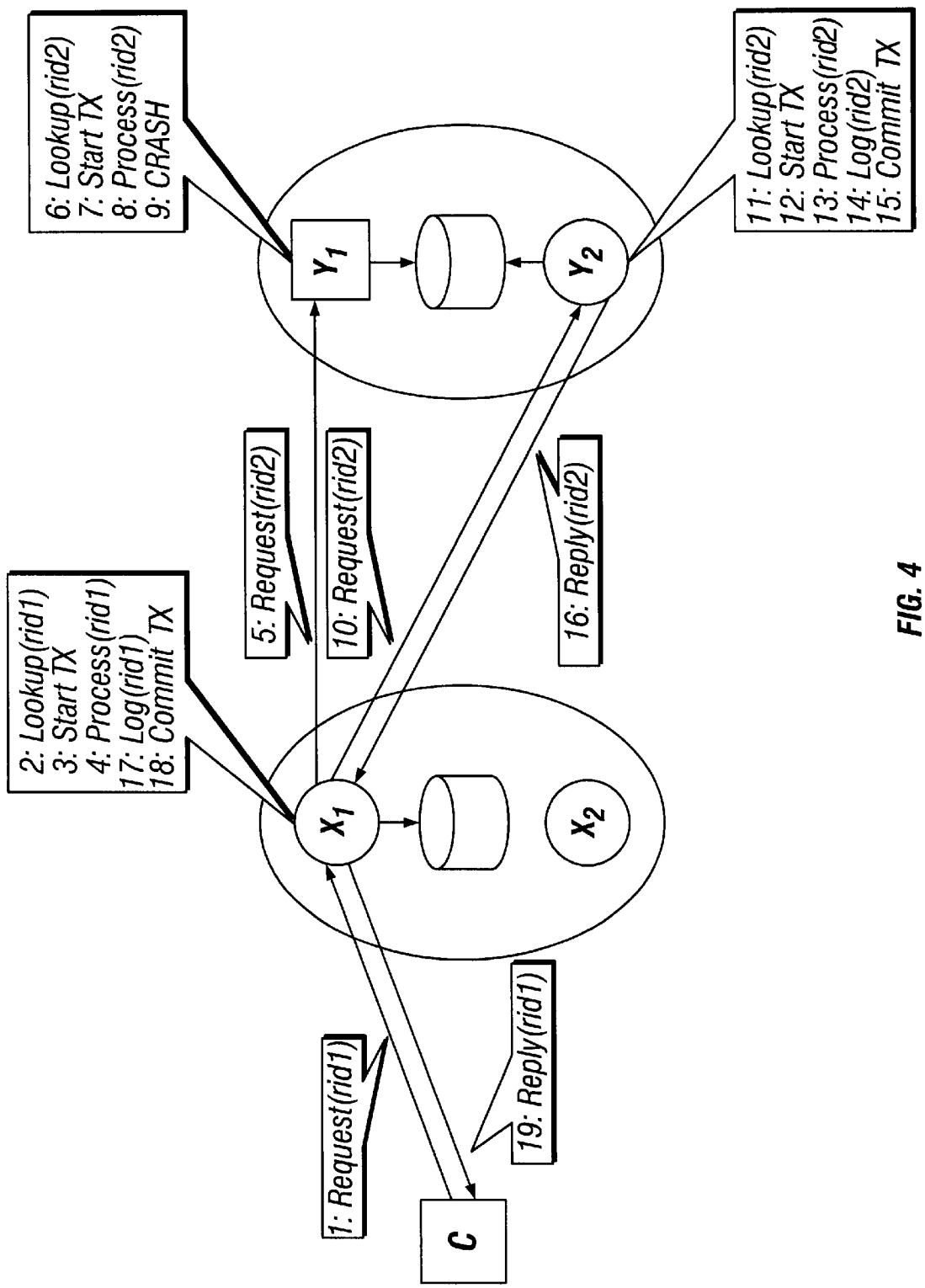
FIG. 4 is a block diagram illustrating a scenario in which an object called with a nested invocation fails after initiating a transaction, according to an embodiment of the invention.

FIG. 4 is a block diagram that illustrates the sequence of events when a particular type of error occurs in a three-entity invocation tree, where the clients and primary replicas are configured to operate as described in FIGS. 2A and 2B, respectively. The particular error illustrated in FIG. 4 is the failure of Y1 before Y1 commits its transaction. Consequently, the sequence of events is identical to the no-failure scenario shown in FIG. 3 up to the point where Y1 is processing the request from X1.

Because Y1 has crashed, X1 will not receive a reply from Y1 within the predetermined time period. However, because the operations performed by Y1 where part of a nested transaction, they are rolled back without rolling back the transaction started by X1. The ability to continue without rolling back the transaction started by X1 may be significant, for example, if X1 had performed extensive work as part of that transaction prior to calling Y1.

Consequently, X1 selects a new primary replica of Y ("Y2") and resends the request (containing rid2) to Y2. Upon receiving the invocation, Y2 performs a lookup operation to determine whether a log contains a record associated with rid2. In the present example, the log will not contain any record associated with rid2 because any log record generated by Y1 for rid2 would have been generated as part of a transaction that never committed. Consequently, when that transaction is rolled back, any such record would have been removed from the log. Similarly, the effects of any operations performed by Y1 in response to the request associated with rid2 that were made prior to the failure of Y1 will also have been undone.

Upon determining that the log does not have a record for rid2, Y2 begins a transaction and then processes the request as part of the transaction. For the purpose of illustration, it shall be assumed that Y2 does not invoke any other entity during the processing of the request. After processing the request, Y2 logs a record for rid2 that includes the reply to the request associated with rid2. Y2 then commits the transaction, and sends the reply to X1.

After receiving the reply from Y1, X1 logs a record for rid1 that includes the reply to the request associated with rid1. X1 then commits the transaction, and sends its reply to C.

Failure of Y1 After Y1 Commits

Figure 5:
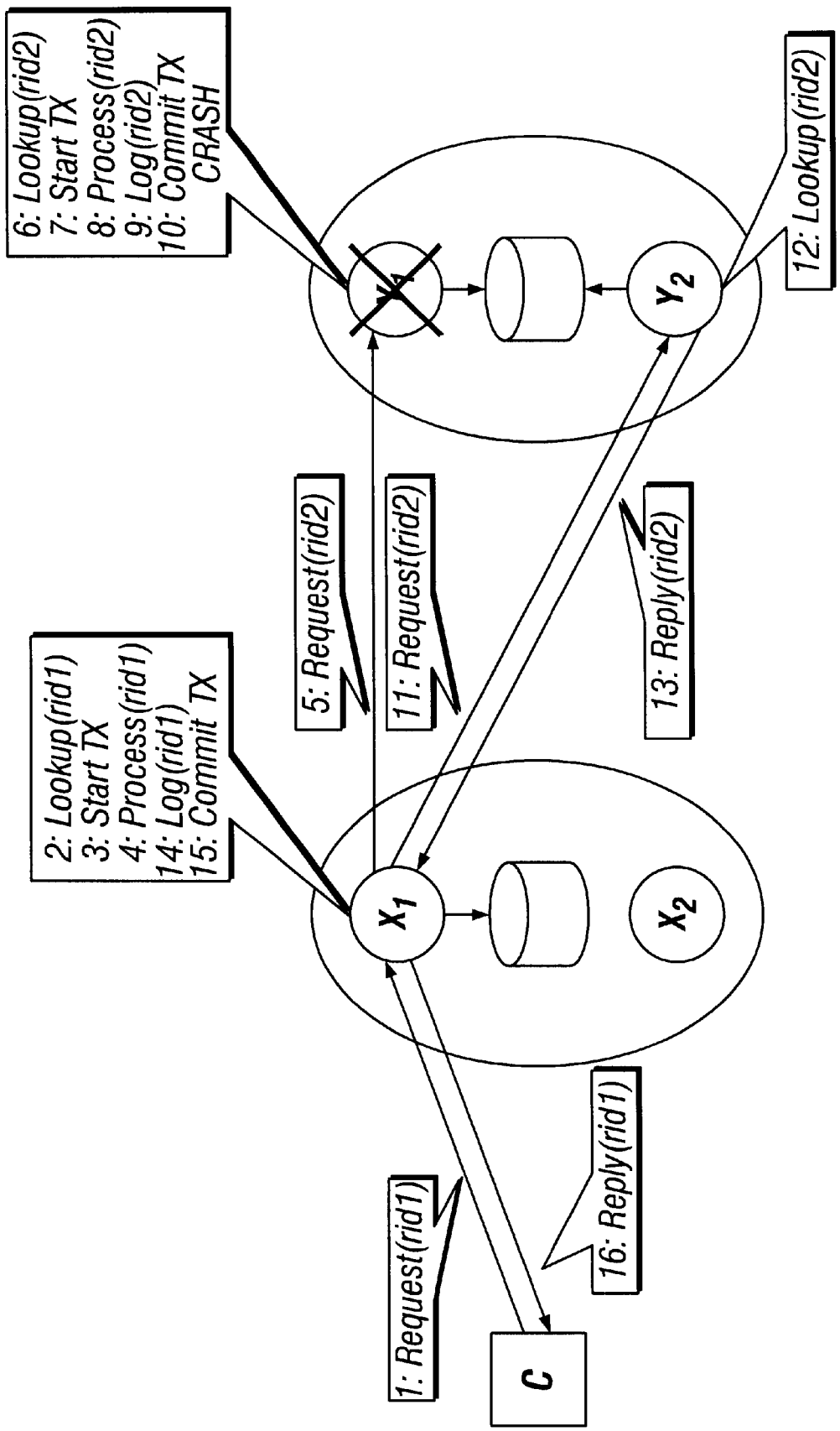
FIG. 5 is a block diagram illustrating a scenario in which an object called with a nested invocation fails after committing a transaction, according to an embodiment of the invention.

FIG. 5 is a block diagram that illustrates the sequence of events when a particular type of error occurs in a three-entity invocation tree, where the clients and primary replicas are configured to operate as described in FIGS. 2A and 2B, respectively. The particular error illustrated in FIG. 5 is the failure of Y1 after Y1 commits its transaction, but before Y1 sends a reply to X1. Consequently, the sequence of events is identical to the no-failure scenario shown in FIG. 3 up to the point where Y1 replies to the request from X1.

Because Y1 has crashed prior to replying to X1, X1 will not receive a reply from Y1 within the predetermined time period. Consequently, X1 selects Y2 to be the new primary replica of Y and resends the request (containing rid2) to Y2. Upon receiving the invocation, Y2 performs a lookup operation to determine whether a log contains a record associated with rid2. In the present example, the log will contain a record associated with rid2 because a record associated with rid2 was logged by Y1 in a transaction that committed. The effects of all operations performed by Y1 in response to the request associated with rid2 that were made prior to the failure of Y1 will also have been committed.

Upon determining that the log does have a record for rid2, Y2 reads the reply from the record and transmits the reply to X1 in response to the request from X1. Y2 performs no further processing in response to the request from X1. After receiving the reply from Y2, X1 logs a record for rid1 that includes the reply to the request associated with rid1. X1 then commits the transaction, and sends its reply to C.

Failure of X1 Before Commit and After Invoking Y1, where X is Deterministic

Figure 6:
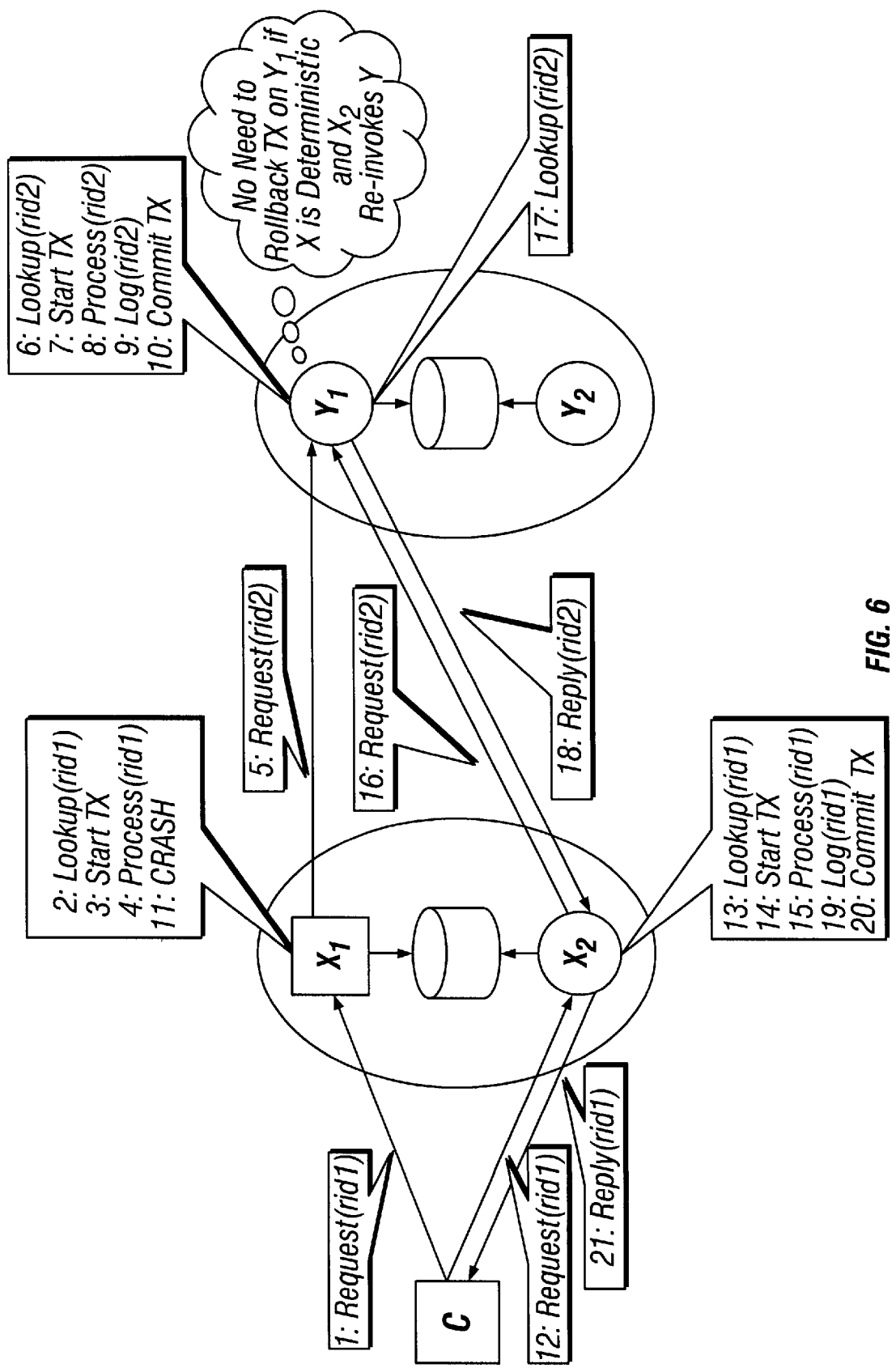
FIG. 6 is a block diagram illustrating a scenario in which an object makes a nested invocation and fails after the object invoked in the nested transaction commits the transaction, according to an embodiment of the invention.

FIG. 6 is a block diagram that illustrates the sequence of events when a particular type of error occurs in a three-entity invocation tree, where the clients and primary replicas are configured to operate as described in FIGS. 2A and 2B, respectively. The particular error illustrated in FIG. 6 is the failure of X1 after invoking Y1 but before X1 commits its transaction. Consequently, the sequence of events is similar to the no-failure scenario shown in FIG. 3 up to the point where Y1 commits its transaction associated with TX. However, unlike the process shown in FIG. 3, none of the transactions that are started are nested.

Because X1 has crashed, C will not receive a reply from X1 within the predetermined time period. Consequently, C selects a new primary replica of X ("X2") and resends the request (containing rid1) to X2. Upon receiving the invocation, X2 performs a lookup operation to determine whether a log contains a record associated with rid1. In the present example, the log will not contain any record associated with rid1 because any log record generated by X1 for rid1 would have been generated as part of a transaction that never committed. Consequently, when that transaction is rolled back, any such record would have been removed from the log. Similarly, the effects of any operations performed by X1 in response to the request associated with rid1 that were made prior to the failure of X1 will also have been undone.

Upon determining that the log does not have a record for rid1, X2 begins a transaction and then processes the request as part of the transaction. During the processing of the request, X2 invokes Y1 with a request that includes the request identifier rid2. Upon receiving the invocation, Y1 performs a lookup operation to determine whether a log contains a record associated with rid2. In the present example, the log will contain a record associated with rid2 because a record associated with rid2 was logged by Y1 in a transaction that committed before X1 failed. The effects of all operations performed by Y1 in response to the request associated with rid2 that were made prior to the failure of Y1 will also have been committed.

Upon determining that the log does have a record for rid2, Y1 reads the reply from the record and transmits the reply to X2 in response to the request from X2. Y1 performs no further processing in response to the request from X2. After receiving the reply from Y1, X2 logs a record for rid1 that includes the reply to the request associated with rid1. X1 then commits the transaction, and sends its reply to C.

The sequence of events illustrated in FIG. 6 assumes that object X is deterministic. Because object X is deterministic, object Y is able to commit its changes without regard to whether object X is able to successfully commit. Because object X is deterministic, object Y can be assured that even if the current primary replica of object X fails to commit, a subsequent primary replica of object X will (1) send the same request to object Y and (2) will commit its transaction. If object X is not deterministic, then a nested transaction is used, as shall now be described with reference to FIG. 7.

Figure 7:
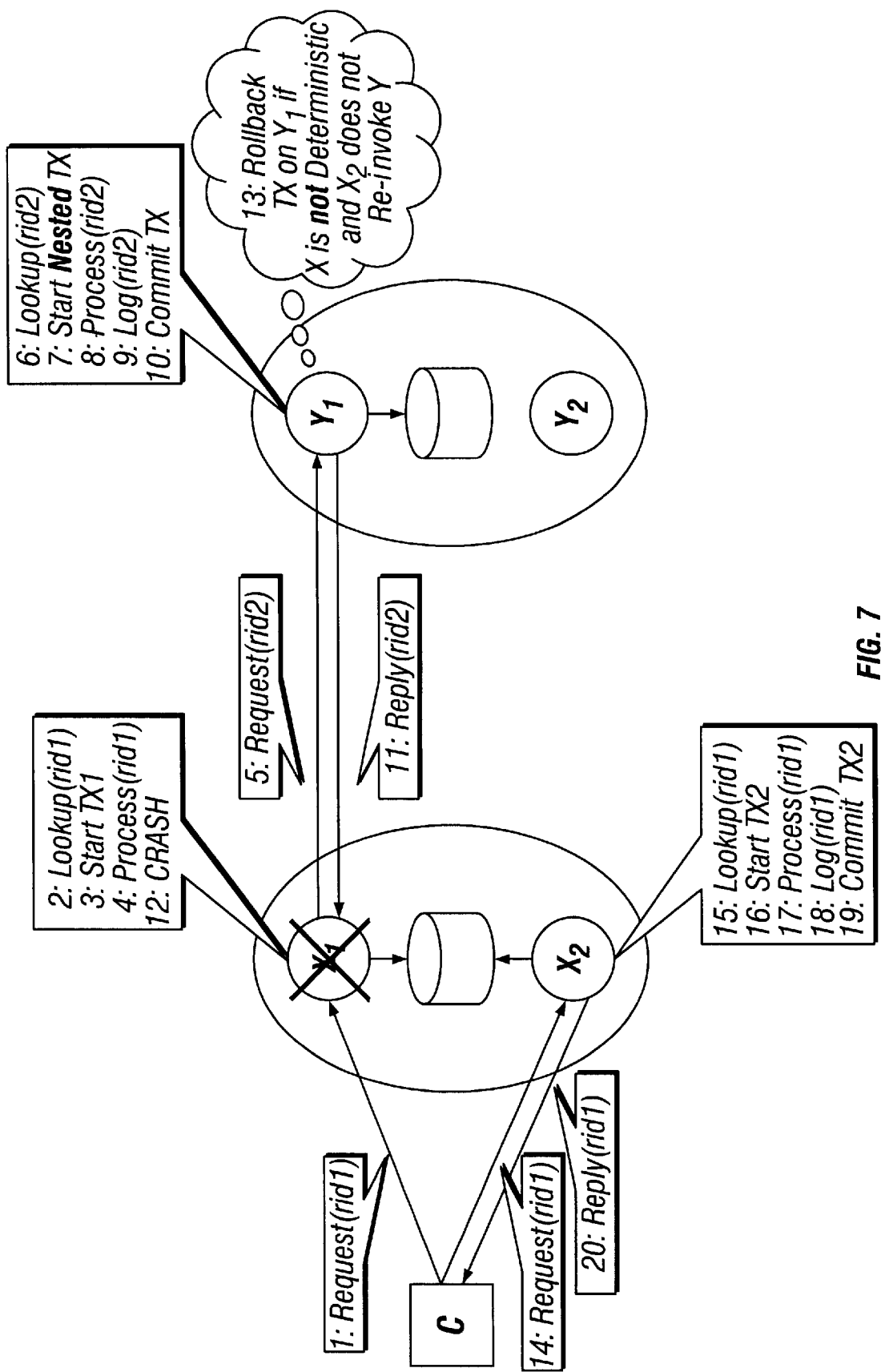
FIG. 7 is a block diagram illustrating a scenario in which an object makes a nested invocation and fails after the object invoked in the nested transaction commits the transaction, according to an embodiment of the invention.

Failure of X1 Before Commit and After Invoking Y1, where X is not Deterministic FIG. 7 is a block diagram that illustrates the sequence of events when a particular type of error occurs in a three-entity invocation tree, where the clients and primary replicas are configured to operate as described in FIGS. 2A and 2B, respectively. The particular error illustrated in FIG. 7 is the failure of X1 after invoking Y1 but before X1 commits its transaction, where X is a non-deterministic object. The sequence of events is identical to the no-failure scenario shown in FIG. 3 prior to the point where Y1 commits its transaction. However, the transaction started by Y1 is a nested transaction within the transaction TX1 executing within X1, that caused the invocation of Y1. Consequently, the nested transaction started by Y1 will be rolled back if TX1 is rolled back.

After completing all processing, Y1 commits, and sends a reply to X1. Because X1 has crashed, C will not receive a reply from X1 within the predetermined time period. Consequently, C selects a new primary replica of X ("X2") and resends the request (containing rid1) to X2. Upon receiving the invocation, X2 performs a lookup operation to determine whether a log contains a record associated with rid1. In the present example, the log will not contain any record associated with rid1 because any log record generated by X1 for rid1 would have been generated as part of transaction TX1 that never committed. Consequently, when TX1 is rolled back, any such record would have been removed from the log. Similarly, the effects of any operations performed by X1 in response to the request associated with rid1 that were made prior to the failure of X1 will also have been undone, and the effects of any operations performed by Y1 in response to the request associated with rid2 will also have been undone.

Upon determining that the log does not have a record for rid1, X2 begins a new transaction TX2 and then processes the request as part of the transaction. During the processing of the request, X2 may or may not invoke Y1. Specifically, because object X is non-deterministic, the factors that caused X1 to invoke Y1 may have changed, thereby causing X2 to process the same request from C without invoking Y. In the scenario illustrated in FIG. 7, X2 processes the request from C without invoking Y1. After performing the operations required to process the request, X2 logs a record for rid1 that includes the reply to the request associated with rid1. X1 then commits TX2, and sends its reply to C.

Because the operations performed by Y1 were part of a nested transaction within TX1, and TX1 did not commit, the operations performed by Y1 will be rolled back. Consequently, even though X2 did not invoke Y1 after the crash of X1, the system was returned to a consistent state.

Savepoints

In the examples illustrated above, a nested transaction is used to perform operations in objects called by non-determinisitic objects to guarantee that (1) nested invocations will be rolled back if the transactions in which they are nested fail, and (2) nested invocations can be rolled back if they fail without rolling back the transaction in which they are nested. However, other mechanisms may be used instead of or in addition to nested transactions to achieve this result. For example, nested transactions can be replaced by mechanisms like savepoints, with the transaction context being propagated in nested invocations.

Savepoints are intermediate markers used to specify locations within transactions. If an error occurs during the processing of a transaction that includes one or more savepoints, then the transaction is rolled back to the last savepoint in the transaction, rather than all the way to the beginning of the transaction.

In an embodiment that uses a savepoint, a calling object may set a savepoint prior to invoking another object, or the called object may set a savepoint prior to performing any work in response to the call. All operations performed by the called object in response to the call are performed as part of that same transaction that is being executed by the calling object. If the primary replica of the called object fails, then the transaction is rolled back to the savepoint prior to the call. The calling object may then re-issue the invocation to a newly selected primary replica of the called object without rolling back all operations performed by the calling object that were made prior to the savepoint.

Embodiments may implement the techniques described herein without employing savepoints or nested transactions. In embodiments that do not use nested transactions or savepoints, operations performed by X and Y may be performed as part of a single transaction. Under these circumstances, a failure of the primary replica of either X or Y would cause all changes made by both X and Y to roll back. This may result in the need to re-execute some of the operations that were rolled back, where such re-execution may have been avoided through the use of nested transactions or savepoints.

Assumptions and Variations

The techniques described above assume that all replicas of a replicated object can access the same log. The log may be, for example, a shared database that is used for logging messages. The shared database itself may be replicated for high availability. In addition, the techniques assume that one of the following is true for each object Y (whether or not replicated) that is invoked by a replica X that uses this technique (next object in the invocation path):

Y uses the same technique and supports nested transactions (or similar mechanisms, such as save points).

Y uses the same technique and supports flat transactions. X must be deterministic if Y induces any state change in its invocation sub-tree.

Y is deterministic and idempotent or appears so (e.g., it discards duplicates and always returns the same reply). X must deterministic if Y induces any state change in its invocation sub-tree.

In the description given above, it was stated that the calling object selects a new primary replica of the called object when the current primary replica of the called object fails. However, selection of a new primary replica may be performed in a variety of ways. For example, in one embodiment, the remaining replicas may negotiate among themselves which replica is to be the primary replica. If a calling object invokes a replica other than the new primary replica, the invoked replica may simply respond by sending the calling object data that identifies the new primary replica. The calling object may then invoke the correct new primary replica.

The techniques described herein may be combined with various other passive replication techniques. For example, any number of well-known techniques may be used to select a new primary replica in response to a failure, and to communicate the state of a failed replica to the new primary replica. Similarly, any number of techniques may be used to generate and log records, and to provide the replicas of a replicated object shared access to the log.

Hardware Overview

Figure 8:
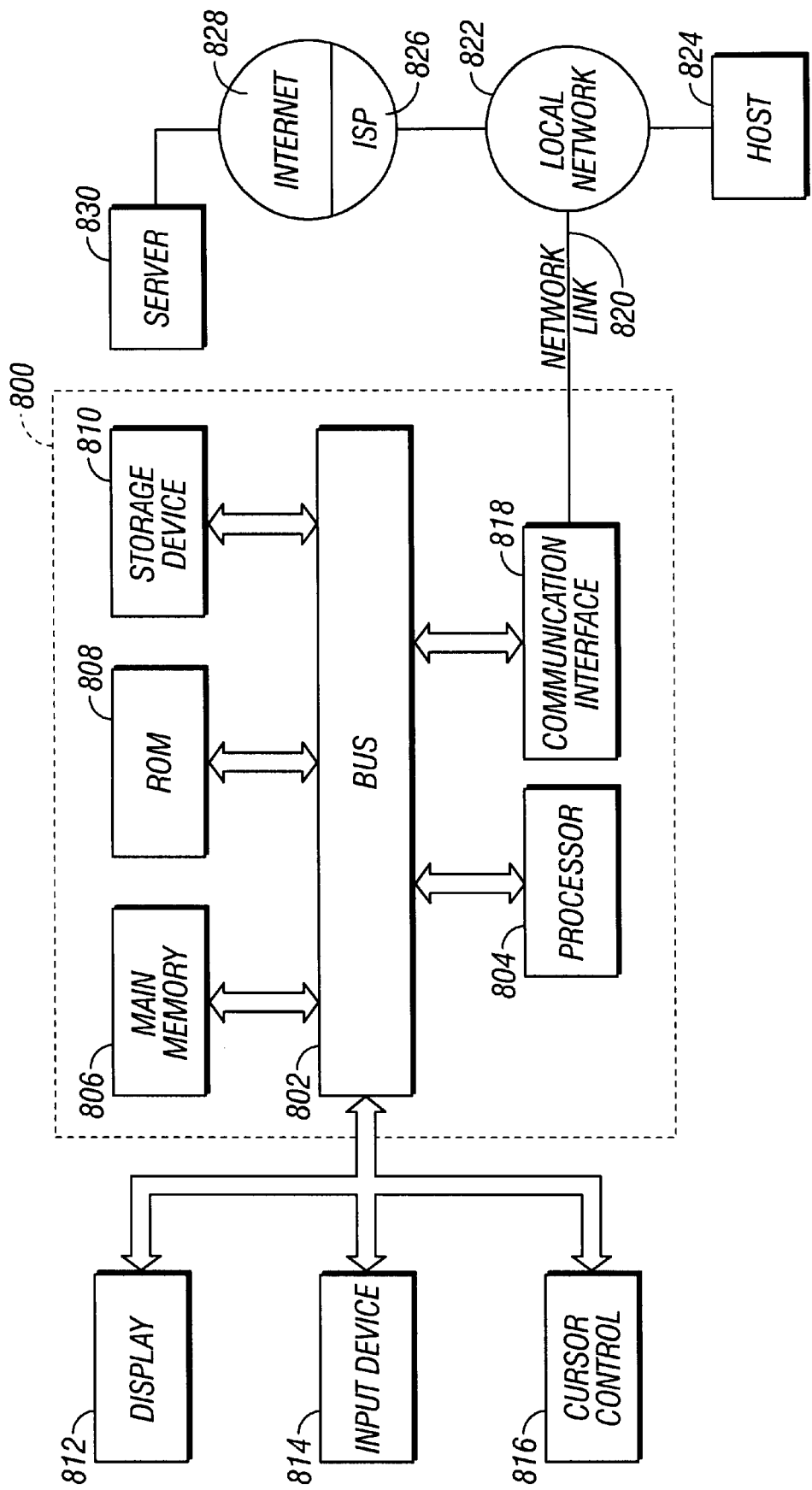
FIG. 8 is a block diagram of a computer system upon which embodiments of the invention may be implemented according to an embodiment of the invention.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are implemented by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hardwired circuitry may be used in place of or in combination with software instructions to implement the invention. Thus, embodiments of the invention are not limited to any specific combination of hardware circuitry and software. The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application implements the techniques described herein.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for executing an operation in which a client invokes a replicated object, the method comprising the steps of:
   receiving, at a primary replica of said replicated object, a first request from said client, wherein said first request includes a request identifier;
   determining whether a record exists that corresponds to the request identifier;
   if a record exists that corresponds to the request identifier, then said primary replica responding to said first request with a reply associated with said record;
   if no record exists that corresponds to the request identifier, then the primary replica performing the steps of
   starting a transaction;
   as part of the transaction, processing said first request;
   as part of the transaction, storing a record associated with the request identifier and a reply to the first request;
   committing said transaction; and
   delivering said reply to said client.

2. The method of claim 1, wherein the step of processing said first request includes executing logic that is non-deterministic which acts to perform based at least in part on one or more factors other than
   the state of the primary replica when the first request is received; and
   the content of the first request.

3. The method of claim 1 wherein the step of processing said first request includes the steps of:
   sending a second request to a server; and
   receiving a second reply from said server in response to said second request.

4. The method of claim 3 wherein:
   the server is a second replicated object;
   the step of sending the second request to the server includes repeatedly performing the following steps until a reply is received from a replica of the second replicated object:
   sending the second request to the primary replica of the second replicated object; and
   if the primary replica of the second replicated object does not respond within a predetermined period, then selecting a different replica of the second replicated object as a new primary replica.

5. The method of claim 2 wherein the step of processing said first request includes the step causing a primary replica of a second replicated object to perform an operation within a nested transaction to said transaction.

6. The method of claim 1 wherein:
   the client is deterministic; and
   the step of starting a transaction is performed by starting a transaction that is not nested within or part of any transaction executing on said client.

7. The method of claim 1 wherein:
   the client is non-deterministic;
   the first request is sent to the primary replica as part of a transaction executing on the client; and
   the step of starting a transaction is performed by starting a transaction that is part of the transaction executing on the client.

8. The method of claim 7 further comprising the step of setting a savepoint before the primary replica perform s the step of processing said first request.

9. The method of claim 1 wherein:
   the client is non-deterministic;
   the first request is sent to the primary replica as part of a transaction executing on the client; and
   the step of starting a transaction is performed by starting a transaction that is nested within the transaction executing on the client.

10. A computer-readable medium bearing instructions for executing an operation in which a client invokes a replicated object, the instructions including instructions for performing the steps of:
    receiving, at a primary replica of said replicated object, a first request from said client, wherein said first request includes a request identifier;
    determining whether a record exists that corresponds to the request identifier;
    if a record exists that corresponds to the request identifier, then said primary replica responding to said first request with a reply associated with said record;
    if no record exists that corresponds to the request identifier, then the primary replica performing the steps of
    starting a transaction;
    as part of the transaction, processing said first request;
    as part of the transaction, storing a record associated with the request identifier and a reply to the first request;
    committing said transaction; and
    delivering said reply to said client.

11. The computer-readable medium of claim 10, wherein the step of processing said first request includes executing logic that is non-deterministic which acts to perform based at least in part on one or more factors other than
    the state of the primary replica when the first request is received; and
    the content of the first request.

12. The computer-readable medium of claim 11 wherein the step of processing said first request includes the step causing a primary replica of a second replicated object to perform an operation within a nested transaction to said transaction.

13. The computer-readable medium of claim 10 wherein the step of processing said first request includes the steps of:
    sending a second request to a server; and
    receiving a second reply from said server in response to said second request.

14. The computer-readable medium of claim 13 wherein:

the server is a second replicated object;

the step of sending the second request to the server includes repeatedly performing the following steps until a reply is received from a replica of the second replicated object:

sending the second request to the primary replica of the second replicated object; and if the primary replica of the second replicated object does not respond within a predetermined period, then selecting a different replica of the second replicated object as a new primary replica.

15. The computer-readable medium of claim 10 wherein:

the client is deterministic; and the step of starting a transaction is performed by starting a transaction that is not nested within or part of any transaction executing on said client.

16. The computer-readable medium of claim 10 wherein:

the client is non-deterministic;

the first request is sent to the primary replica as part of a transaction executing on the client; and the step of starting a transaction is performed by starting a transaction that is part of the transaction executing on the client.

17. The computer-readable medium of claim 16 further comprising instructions for performing the step of setting a savepoint before the primary replica performs the step of processing said first request.

18. The computer-readable medium of claim 10 wherein:

the client is non-deterministic;

the first request is sent to the primary replica as part of a transaction executing on the client; and the step of starting a transaction is performed by starting a transaction that is nested within the transaction executing on the client.

19. A system for executing an operation, the system comprising:

a client configured to send a first request to a replicated object, wherein said first request includes a request identifier;

a primary of replica of said replicated object that is configured to respond to the first request by performing the following steps:

determining whether a record exists that corresponds to the request identifier;

if a record exists that corresponds to the request identifier, then said primary replica responding to said first request with a reply associated with said record;

if no record exists that corresponds to the request identifier, then the primary replica performing the steps of starting a transaction;

as part of the transaction, processing said first request;

as part of the transaction, storing a record associated with the request identifier and a reply to the first request;

committing said transaction; and delivering said reply to said client.

20. The system of claim 19, wherein the primary replica is configured to process said first request by executing logic that is non-deterministic which acts to perform based at least in part on one or more factors other than the state of the primary replica when the first request is received; and the content of the first request.

21. The system of claim 20 wherein the primary replica of a second replicated object is configured to respond to the second request by performing an operation within a nested transaction to said transaction.

22. The system of claim 19 further including:

a server;

wherein the primary replica is configured to process the first request by performing actions that include:

sending a second request to said server; and receiving a second reply from said server in response to said second request.

23. The system of claim 21 wherein:

the server is a second replicated object;

the primary replica is configured to repeatedly perform the following steps until a reply is received from a replica of the second replicated object:

sending the second request to the primary replica of the second replicated object; and if the primary replica of the second replicated object does not respond within a predetermined period, then selecting a different replica of the second replicated object as a new primary replica.

24. The system of claim 19 wherein:

the client is deterministic; and the primary replica is configured to start said transaction by starting a transaction that is not nested within or part of any transaction executing on said client.

25. The system of claim 19 wherein:

the client is non-deterministic;

the first request is sent to the primary replica as part of a transaction executing on the client; and the primary replica is configured to start said transaction by starting a transaction that is part of the transaction executing on the client.

26. The system of claim 25 wherein a savepoint is set before the primary replica processes said first request.

27. The system of claim 19 wherein:

the client is non-deterministic;

the first request is sent to the primary replica as part of a transaction executing on the client; and the primary replica is configured to start the transaction by starting a transaction that is nested within the transaction executing on the client.

* * * * *

UNITED STATES PATENT AND TRADEMARK OFFICE
CERTIFICATE OF CORRECTION

PATENT NO. : 6,574,750 B1  
DATED : June 3, 2003  
INVENTOR(S) : Felber et al.

It is certified that error appears in the above-identified patent and that said Letters Patent is hereby corrected as shown below:

<u>Column 13,</u>
Lines 42-46, replace "non-deterministic which acts to perform based at least in part of one or more factors other than
  the state of the primary replica when the first request is received; and
  the content of the first request." with -- non-deterministic. --;

<u>Column 14,</u>
Line 16, replace "perform s" with -- performs --;
Lines 52-56, replace "non-deterministic which acts to perform based at least in part of one or more factors other than
  the state of the primary replica when the first request is received; and
  the content of the first request." with -- non-deterministic. --;

<u>Column 16,</u>
Lines 8-12, replace "non-deterministic which acts to perform based at least in part of one or more factors other than
  the state of the primary replica when the first request is received; and
  the content of the first request." with -- non-deterministic. --;

Signed and Sealed this

Ninth Day of December, 2003

JAMES E. ROGAN
*Director of the United States Patent and Trademark Office*